United States Patent
Brand

(10) Patent No.: US 9,519,653 B2
(45) Date of Patent: Dec. 13, 2016

(54) TECHNIQUES FOR EFFICIENTLY ENFORCING RESOURCE QUOTAS IN A MULTI-TENANT CLOUD STORAGE SYSTEM

(71) Applicant: CTERA Networks, Ltd., Petach-Tikva (IL)

(72) Inventor: Aron Brand, Petach-Tikva (IL)

(73) Assignee: Ctera Networks, Ltd., Petach-Tikva (IL)

( * ) Notice: Subject to any disclaimer, the term of this patent is extended or adjusted under 35 U.S.C. 154(b) by 234 days.

(21) Appl. No.: 14/227,278

(22) Filed: Mar. 27, 2014

(65) Prior Publication Data

US 2014/0297781 A1    Oct. 2, 2014

Related U.S. Application Data

(60) Provisional application No. 61/807,079, filed on Apr. 1, 2013.

(51) Int. Cl.
| | | |
|---|---|---|
| G06F 17/30 | (2006.01) | |
| H04L 29/06 | (2006.01) | |
| H04L 29/08 | (2006.01) | |

(52) U.S. Cl.
CPC ... G06F 17/30174 (2013.01); G06F 17/30115 (2013.01); G06F 17/30194 (2013.01); H04L 63/10 (2013.01); H04L 67/1097 (2013.01)

(58) Field of Classification Search
CPC .............................. H04L 63/10; H04L 67/1097
See application file for complete search history.

(56) References Cited

U.S. PATENT DOCUMENTS

| | | | |
|---|---|---|---|
| 7,716,275 B1* | 5/2010 | Nagaralu | G06F 9/5011 709/203 |
| 8,291,159 B2 | 10/2012 | Rajagopal et al. | |
| 8,452,872 B2* | 5/2013 | Castro Castro | H04L 12/14 709/224 |
| 8,515,904 B1 | 8/2013 | Dwyer et al. | |
| 8,554,809 B1 | 10/2013 | Zhou et al. | |
| 8,578,119 B2 | 11/2013 | Desai et al. | |
| 8,589,355 B2 | 11/2013 | Nagpal et al. | |
| 8,589,936 B2 | 11/2013 | Murray et al. | |
| 2007/0027941 A1* | 2/2007 | Attila Becker-Szendy | G06F 9/5016 |
| 2008/0256103 A1* | 10/2008 | Fachan | G06F 9/466 |
| 2010/0174745 A1* | 7/2010 | Ryan | G06F 3/0608 707/770 |
| 2012/0272237 A1 | 10/2012 | Baron | |
| 2013/0019015 A1 | 1/2013 | Devarakonda et al. | |
| 2013/0067540 A1* | 3/2013 | Mukkara | H04L 67/1097 726/4 |

(Continued)

*Primary Examiner* — Lashonda Jacobs
(74) *Attorney, Agent, or Firm* — M&B IP Analysts, LLC

(57) ABSTRACT

A method and system for enforcing resource quotas in cloud storage systems are provided. The method comprises receiving a request to write an object to a target folder of a tenant, wherein the tenant is initially configured with a tenant quota limit and each of a plurality of folders of the tenant initially is configured with a folder quota limit, wherein the tenant quota limit is then dynamically allocated to the plurality of folders of the tenant; determining whether the folder quota limit of the target folder of the tenant is sufficient for storage of the object; upon determining that the folder quota limit of the target folder is sufficient, increasing a folder quota usage of the target folder by a delta value; and storing the object in the target folder.

17 Claims, 4 Drawing Sheets

(56) References Cited

U.S. PATENT DOCUMENTS

| | | | | |
|---|---|---|---|---|
| 2013/0173717 | A1* | 7/2013 | Subramanian | H04M 15/39 709/206 |
| 2013/0232179 | A1* | 9/2013 | Chhaunker | G06F 17/3007 707/827 |
| 2014/0075029 | A1* | 3/2014 | Lipchuk | G06F 9/505 709/226 |
| 2014/0149475 | A1* | 5/2014 | Darcy | G06F 17/30283 707/827 |
| 2014/0189682 | A1* | 7/2014 | Crudele | G06F 9/45558 718/1 |
| 2014/0280975 | A1* | 9/2014 | Mordani | H04L 41/5041 709/226 |
| 2014/0282589 | A1* | 9/2014 | Kuang | G06F 9/5016 718/104 |
| 2014/0289412 | A1* | 9/2014 | Doddavula | H04L 41/5003 709/226 |
| 2014/0358620 | A1* | 12/2014 | Krebs | G06Q 10/06315 705/7.25 |
| 2014/0359113 | A1* | 12/2014 | Krebs | H04L 41/5009 709/224 |
| 2015/0067069 | A1* | 3/2015 | Gourevitch | H04L 51/12 709/206 |
| 2015/0089065 | A1* | 3/2015 | Kasso | H04L 47/741 709/226 |
| 2015/0269511 | A1* | 9/2015 | Busayarat | G06Q 10/06315 705/7.25 |
| 2015/0296016 | A1* | 10/2015 | Bennett, Jr. | H04L 63/104 709/213 |

\* cited by examiner

TECHNIQUES FOR EFFICIENTLY ENFORCING RESOURCE QUOTAS IN A MULTI-TENANT CLOUD STORAGE SYSTEM

CROSS-REFERENCE TO RELATED APPLICATIONS

This application claims the benefit of U.S. Provisional Application No. 61/807,079 filed on Apr. 1, 2013, the contents of which are hereby incorporated by reference.

TECHNICAL FIELD

The invention generally relates to techniques for enforcing resource quotas in a cloud storage system and, more particularly, to efficient techniques for maintaining resource quotas in cloud systems that are accessible to multiple users.

BACKGROUND

The demand for data storage has been rapidly escalating because, as the amount of data such as digital media stored by users grows, so does the need to store digital media reliably over extended periods of time. Traditional backup solutions periodically copy data to, for example, backup tapes, compact discs (CDs), or other local storage media. However, such solutions are not optimal because the backup media is stored in a single location, and the media being used for backup has typically been prone to failure.

Commercially available services that are referred to as cloud storage services (CSS) provide mass storage through a web service interface available through the Internet. The storage infrastructure includes a distributed array of geographically distributed data centers connected to a plurality of clients through a wide area network (WAN). A data center typically consists of servers and mass storage to facilitate cloud storage services to the clients. Such services enable applications including, for example, backup and restoration of data, data synchronization, file sharing, and so on.

Cloud storage services are accessible to users from anywhere in the world via a client implementing a web services' interface designed to at least synchronize data with the data centers. However, such web services fail to provide standard file sharing protocols (e.g., common internet file system (CIFS) or network file system (NFS)). In addition, the cost of accessing files stored in the cloud storage directly from the LAN is typically lower than accessing files on the same LAN that are simply stored in local storage devices.

In a cloud storage system, each tenant (i.e., a paying customer of a service) has a quota of resources which are allocated to a plurality of folders. Quota usage of a tenant is defined as the total amount of resources allocated to folders owned by the tenant (for example, resources may refer to one of more of: storage size in GB, a number of files owned by a tenant; an amount of storage consumed by a specific subset of the files matching a specific criteria, and so on). In current existing solutions, the quota is tracked by a per tenant quota usage counter. When data is stored to the system, the quota usage counter of the tenant is increased by the amount of resources to be consumed, before committing the stored data and sending an acknowledgement reply to the client. Similarly, when data is deleted from the system, the storage counter is decreased accordingly.

A flaw in the existing implementations is that the single quota counter of each tenant must be stored on a single quota tracking server, must be locked while it is being updated, and must be performed as a transaction together with the update of the metadata database. Furthermore, if the metadata database for tracking the cloud storage contents is separate from the quota tracking server, a very expensive two-phase commit operation is required for each storage operation.

Some existing implementations circumvent the performance limitations by compromising on the accuracy of the quota enforcement. As an example, in such implementations, a user may be allowed to allocate slightly more than that user's quota or, if some objects are deleted, the quota space will not be reclaimed immediately. However, in many cases, precise enforcement of quotas is desirable.

A network attached storage (NAS) device for performing NAS operations with cloud storage services is also discussed in the related art. Such a NAS device provides the functionality of data storage, file-based operations (e.g., read, write, delete, modify, etc.), and the management of these functionalities to clients on the network. Specifically, a client can store data in its local storage which is also synchronized with a cloud storage service. The client can access and perform file-based operations either on its local storage or the cloud storage service. An access to the files in the device is typically through a local area network, while access to the cloud storage system is through the Internet.

Such a NAS device that provides cloud storage services can be installed in organizations and enterprises, thereby allowing their users to save data locally to a storage device attached to the NAS device and/or to the cloud. An organization, enterprise, or other entity utilizing the cloud storage service is referred to as a tenant, i.e., a paying customer for the cloud storage services. Tenants may further include one or more users who are not necessarily paying customers themselves, yet may be provided access to the service to write, read, delete, or modify resources stored by the service.

As the cloud resource quota is typically priced by the total capacity assigned to each tenant (e.g., a size of Gigabytes, Terabytes, etc., such as, for example, 2 GB or 1 TB, a number of files, etc.), an enforcement mechanism is implemented to ensure that each tenant does not exceed the total capacity of its purchased quota. An exemplary enforcement mechanism includes assigning a tenant storage usage counter (TUC) for each tenant, and increasing the TUC when data is saved to a folder of tenant T; or decreasing the TUC when the data is deleted by each user of the tenant. When a user writes data to the cloud storage system, TUC is increased by the data's save size (for example, in Megabytes, Gigabytes, Terabytes, count of files, etc.) and compared to the resource quota of the tenant. If the value of the TUC would rise above the quota of the tenant, the write operation is denied. The TUC is locked for each write request from a user and unlocked after the request is approved or denied.

As multiple users can access the cloud storage system concurrently to write to their respective cloud folders, this enforcement mechanism results in lock contention. Lock contention occurs when one user attempts to access the content that is currently being locked by another user.

It would be therefore advantageous to provide an efficient and scalable enforcement mechanism for cloud storage systems.

SUMMARY

Certain embodiments disclosed herein include a method and system for enforcing resource quotas in cloud storage systems. The method comprises receiving a request to write an object to a target folder of a tenant, wherein the tenant is initially configured with a tenant quota limit and each of a plurality of folders of the tenant initially is configured with a folder quota limit, wherein the tenant quota limit is then dynamically allocated to the plurality of folders of the tenant; determining whether the folder quota limit of the target folder of the tenant is sufficient for storage of the object; upon determining that the folder quota limit of the target folder is sufficient, increasing a folder quota usage of the target folder by a delta value; and storing the object in the target folder.

BRIEF DESCRIPTION OF THE DRAWINGS

The subject matter disclosed herein is particularly pointed out and distinctly claimed in the claims at the conclusion of the specification. The foregoing and other features and advantages of the invention will be apparent from the following detailed description taken in conjunction with the accompanying drawings.

DETAILED DESCRIPTION

Figure 1:
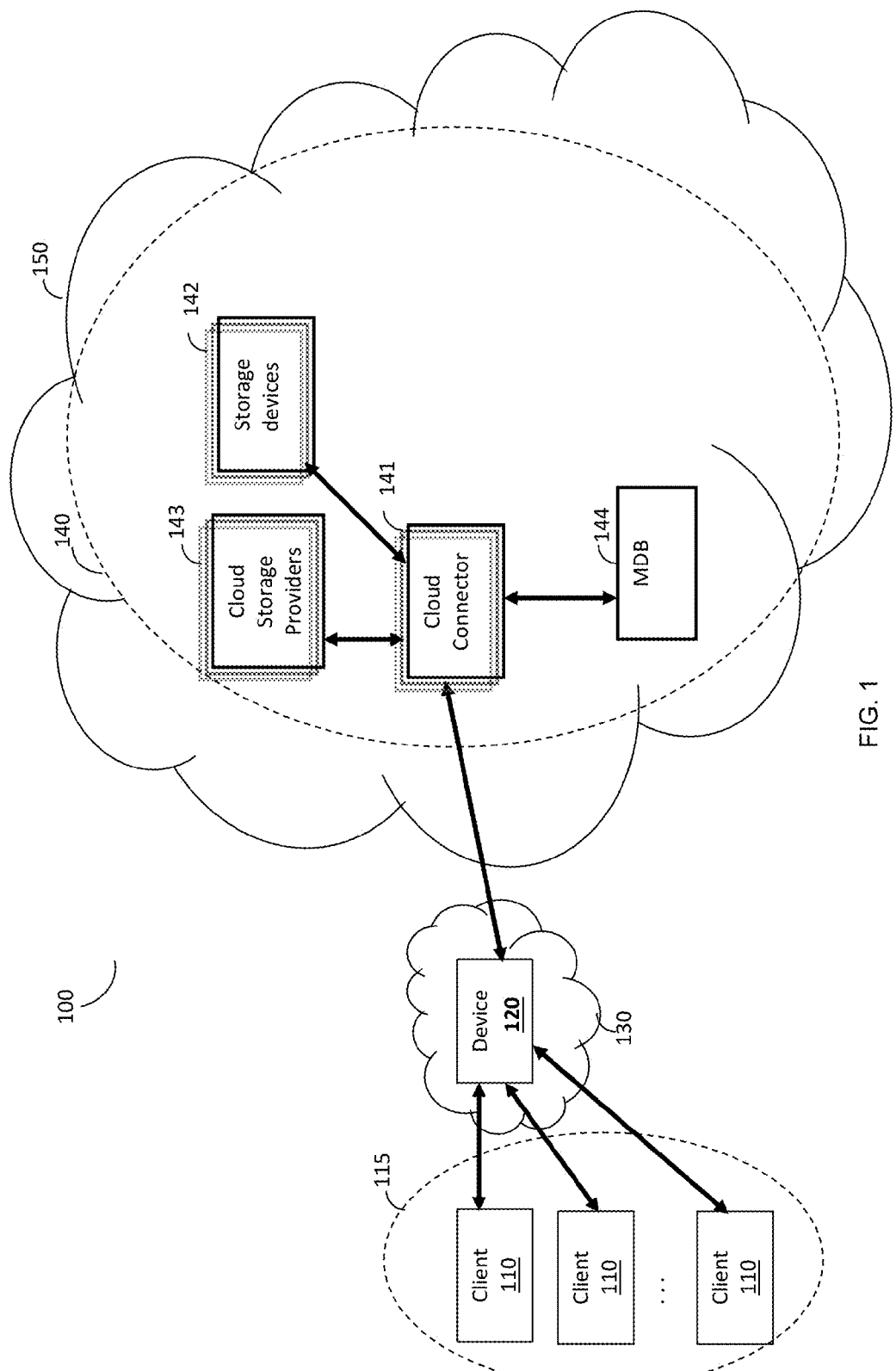
FIG. 1 is a storage network system useful in describing the various disclosed embodiments.

It is important to note that the embodiments disclosed are only examples of the many advantageous uses of the innovative teachings herein. In general, statements made in the specification of the present disclosure do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments include a method for enforcing resource quotas in cloud storage systems. The various embodiments will be described herein in greater detail.

FIG. 1 shows an exemplary and non-limiting diagram of a storage network system 100 utilized to describe the various embodiments disclosed herein. The system 100 includes a plurality of users 110 connected to a device 120 through a local area network (LAN) 130, which may be either a wireless or wired network. The plurality of users 110 belong to a tenant 115. Each user 110 accesses the device 120 to read or write files to cloud folders created for the user.

The device 120 is connected to a cloud storage service (CSS) 140 through the network 150 and is configured to perform at least file-based operations. Such operations may include, but are not limited to, reading, writing, modification, deletion, and the like. The CSS 140 includes a plurality of cloud connectors 141 that facilitate connections between the device 120 and storage devices 142 as well as connections to public cloud storage providers 143 (e.g., Amazon® Web Services, Windows® Azure®, etc.).

Typically, each of the storage devices 142 and storage infrastructures of the cloud storage providers 143 is an object-based storage system. An object-based storage system includes a plurality of object storage devices. An object storage device (OSD) is a computer storage device that organizes data into flexible-sized data containers, objects, instead of providing a block-oriented interface that merely reads and writes fixed-sized blocks of data. Each object saved in the object storage system is identified by an object identifier (ID), which typically is then used to retrieve data from the system.

In accordance with one embodiment, the device 120 may be a cloud-enable storage device configured to provide cloud storage services. An example of such a device and a cloud connector are disclosed in the co-pending patent application Ser. No. 12/641,559, entitled "STORAGE DEVICE AND METHOD THEREOF FOR INTEGRATING NETWORK ATTACHED STORAGE WITH CLOUD STORAGE SERVICES," assigned to the common assignee and the contents of which are herein incorporated by reference.

In certain embodiments, a user can access the CSS 140 to read files or write files through a web portal (e.g., a web portal that is part of network 150) or by means of an agent installed in the device, without the device 120. An example for such an implementation is disclosed in the co-pending patent application Ser. No. 13/205,238, entitled "REMOTE ACCESS SERVICE FOR CLOUD-ENABLED NETWORK DEVICES," assigned to the common assignee, the contents of which are herein incorporated by reference.

The CSS 140 may also include a metadata database (MDB) 144 which maintains the metadata of all files or objects stored in the CSS 140. The metadata may include, but is not limited to, a filename, a file path, a file size, a modification date, and the like.

According to one embodiment, the metadata stored in the MDB 144 includes, for each tenant, a tenant quota usage counter (T.USAGE) and a tenant quota limit (T.LIMIT). To enforce the quota per tenant, the value of T.USAGE must always be less than or equal to T.LIMIT.

In order to reduce the lock contention on T.LIMIT, allocation is performed hierarchically, in two stages. First, chunks of quota are allocated from a tenant T (e.g., tenant 115) to a cloud folder F (e.g., a folder contained in a storage device 142) in coarse granularity. Allocation includes writing one or more resources to a target destination (e.g., a folder designated by a user). Subsequently, a large number of smaller allocations can be performed for storing new files in the cloud folder F directly, without having to modify T.USAGE. As a result of this allocation process, additional storage space is allocated from the tenant by locking and modifying the T.USAGE counter only when the space F.LIMIT allocated to a specific folder F is exhausted. When allocation is performed hierarchically, the T.USAGE counter is infrequently locked.

With this aim, the MDB 144 may store at least one folder quota usage (F.USAGE) and at least one folder quota limit (F.LIMIT) per cloud folder of each tenant. The folder quota usages are automatic quotas maintained internally by the CSS 140 for purpose of improving parallelism. It should be noted that a user 110 can create or can be assigned cloud folders where the user can save data files. For each folder, the value of F.USAGE is enforced by being maintained at less than or equal to F.LIMIT. For each new empty cloud folder created for a user, F.LIMIT and F.USAGE may be initialized to 0. In another embodiment, F.LIMIT of a new empty folder may be set to a value based on estimation of the needed storage in that folder.

Figure 2:
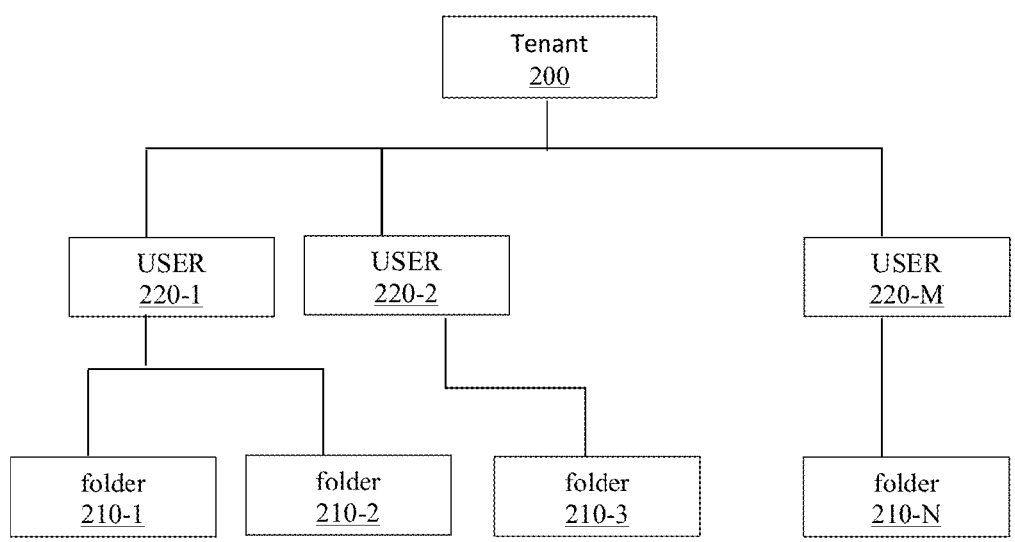
FIG. 2 is a schematic diagram illustrating the relation among a tenant, users, and their cloud folders.

FIG. 2 is a schematic and exemplary diagram of a tenant's data allocation via various users according to an embodiment. A tenant 200 is associated with a plurality of users 220-1 through 220-M (e.g., $USER_1$, $USER_2$, ..., $USER_M$). Each user is assigned one or more cloud folders 210-1 through 210-N (for the sake of simplicity and without limitation, these may be referred to collectively as cloud folders 210 or individually as a cloud folder 210).

As noted above, the tenant 200 may be an enterprise where users are employees of the enterprise that can save files in e.g., the CSS 140. The tenant 200 may be a reseller of the CSS service provider, where users are subscribers of the reseller that can save files in the CSS 140.

The folder usage F.USAGE is equal to the sum of all sizes of the files stored in the cloud folder F. The "size" can be defined, e.g., according to the tenant's preferred business model, either as the actual storage size (after space reduction by methods such as de-duplication and data compression) or as the original file size (i.e., the size of the file before any storage space reduction method was applied), or as any other type of resource which is based on the contents of the folder.

The tenant usage T.USAGE is equal to the sum of the quota limits (F.LIMIT) of all cloud folders of the tenant T. It should be emphasized that T.USAGE is not necessarily a measure of the current storage usage of the tenant alone. Rather, T.USAGE maintains the sum of quota allocations of cloud folders associated with a tenant T (including, e.g., the usage of any clients associated with the tenant). The total storage usage of the tenant T at any point in time is equal to the sum of F.USAGE for all folders F belonging to the T.

The quota enforcement process will be described herein below with a reference to a specific embodiment in which the enforcement of the tenant quota is performed. However, the disclosed process can also be applied for enforcing resource quotas of individual users of a tenant instead of or in addition to enforcing the resource quota of the tenant. In this embodiment, an U.USAGE (the quota usage of a user) is at all times equal to the sum of the quota limits (F.LIMIT) on all cloud folders of the user U.

For example, in the arrangement shown in FIG. 2, U.USAGE of a USER1 220-1 is the sum of the quotas $F_1$.LIMIT and $F_2$.LIMIT of folder 210-1 and 210-2, respectively. The U.QUOTA is enforced such that U.USAGE is at most equal to U.QUOTA. This way, any additional storage space that a user requests is not allocated to a folder of the user if the user does not have sufficient quota or if the tenant does not have sufficient quota.

Figure 3:
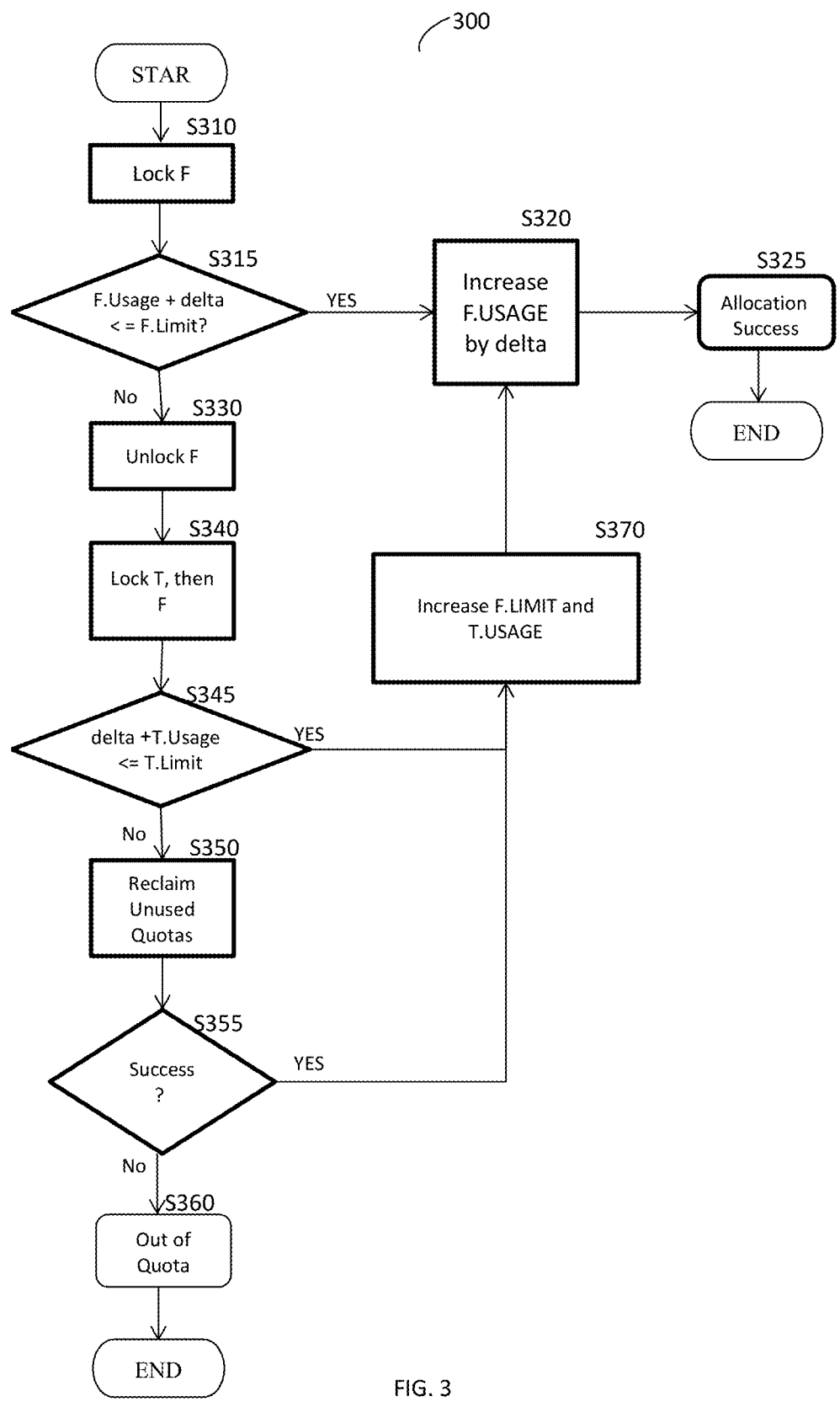
FIG. 3 is a flowchart describing a method for enforcing resource quota in accordance with one embodiment.

FIG. 3 is a non-limiting and exemplary flowchart 300 illustrating a method for resource quota enforcement in a cloud storage system according to an embodiment. The quota enforcement is achieved by ensuring that when a user requests to write a new object or to overwrite existing object, the execution of the request operation does not result in excessive quota use, i.e., that T.USAGE does not exceed T.LIMIT. The resource quota includes, but is not limited to, a storage quota.

At S310, a target folder (e.g., a folder 210) is locked. The target folder is the folder to which a user requests to write an object. Locking a folder or a tenant prevents other users from accessing the folder or the tenant for a period of time that may be, e.g., the time necessary to complete the steps of flowchart 300 or a predefined amount of time. At S315, it is checked whether a value of F.USAGE of the folder 210 plus a delta value is less than the F.LIMIT value of this folder. The delta value is equal to the change in the amount of remaining storage space required by the requested object. When a user requests to overwrite an existing object, the delta value is equal to the difference between the size of the new object and the size of the existing object. When a user requests to write a new object, the delta value is equal to the size of the object. If the sum of F.Usage and the delta value is less than or equal to F.Limit, in S320, F.USAGE is increased by the delta value and, in S325, a message that the allocation succeeded is generated. Otherwise, in S330, the folder 210 is unlocked.

At S340, both the tenant 200 owning the target folder (e.g., folder 210) and the folder (e.g., folder 210) is locked. At S345, a check is made to determine if the T.USAGE plus the delta value is less than or equal to T.LIMIT. If so, in an embodiment at S370, both F.LIMIT of folder 210 and the T.USAGE may be increased by a Desired_Allocation value. This Desired_Allocation value relates to the "coarse granularity" mentioned herein above, i.e., the large quota value (chunk) initially allocated from the tenant quota to the cloud folder quota. This value is computed as the maximum between delta and requested allocation size (i.e., an object size). In that embodiment, after S370, execution of the embodiment continues with S320.

If the sum of T.USAGE and the delta value is greater than T.LIMIT, in S350, unused quotas are reclaimed. This process is described in more detail herein below with respect to FIG. 4. At S355, it is checked whether resource quotas unused by other folders 210 were successfully reclaimed and, if so, execution continues with S370; otherwise, at S360, an out-of-quota message may be generated and then execution terminates. The amount of the unclaimed quota should exceed the Desired_Allocation value defined above.

Figure 4:
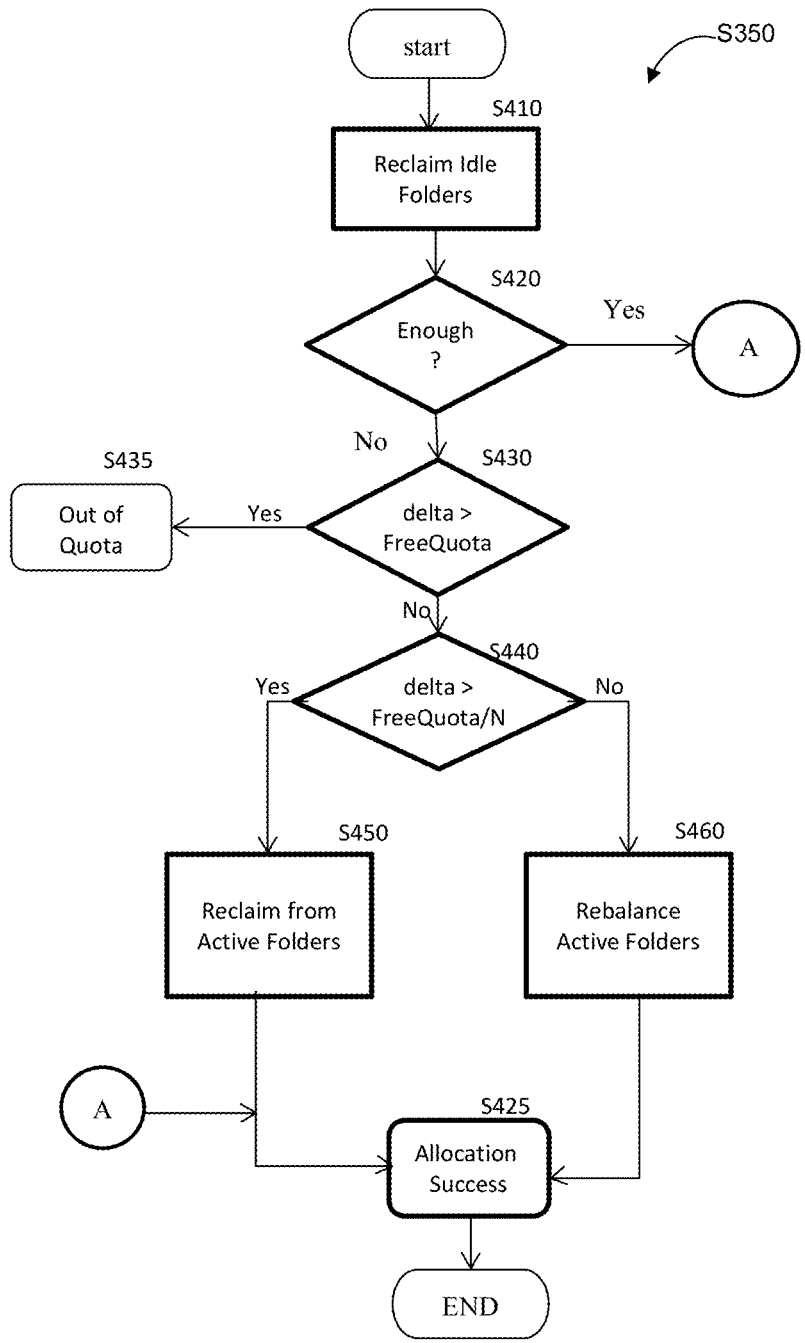
FIG. 4 is a flowchart describing a method for reclaiming unused quota according to one embodiment.

FIG. 4 shows a non-limiting and exemplary flowchart S350 illustrating the reclaiming of unused quotas from folders according to an embodiment. The unused quota may be reclaimed from all folders owned by the tenant, other than the target folder. Specifically, according to one embodiment, a heuristic may be implemented to allow reclaiming of all unused quota from idle folders first. An idle folder is a folder that has not been accessed for at least a predefined time period (e.g., 1 hour) and, as such, is less likely to require its previously allocated quota in the near future. An active folder is a folder that was accessed during a recent predefined time period (e.g., 1 hour) and, as such, has a higher chance of needing this quota in the near future.

According to this embodiment, if sufficient quota cannot be claimed from one or more idle folders, an attempt is made to fairly redistribute the available quota between all the active folders so that, for example, such folders have equal amounts of unused quota. In another embodiment, redistribution may occur such that folders retain equal relative amounts of unused quota (e.g., 20% of the respective F.LIMIT for each one of folders 210). If rebalancing the quota does not provide enough storage space, unused quota may be reclaimed from active folders in a specific order. The reclaiming order is typically from the least recently modified folder to the most recently modified folder.

At S410, the unused quota, if any, for each idle cloud folder is reclaimed. The unused quota of a folder equals the difference between F.LIMIT and F.USAGE of that folder. The amount of quota claimed from all idle folders is reduced from the tenant usage T.USAGE.

At S420, it is checked if there is enough unused quota in idle folders to accommodate the Desired_Allocation. That is, there is enough unused quota in idle folders to accommodate the Desired_Allocation if Available_Quota is greater than the Desired_Allocation, where the Available_Quota equals the total amount of unused quota in idle folders. If so, optionally at S425, a message that sufficient unused quota has been successfully reclaimed and allocated may be generated and the execution of S350 terminates. Otherwise, at S430, it is checked if the delta value is higher than a Free_Quota value. The Free_Quota value is the total size of all quotas remaining in all active folders of the tenant. If so, in S435, an out-of-quota message may be generated and execution of S350 terminates. If there is not enough Free_Quota in the active folders, at S440, it is checked if the delta value exceeds the quotient of Free_Quota by the number (N) of active folders including the target folder. If so, execution proceeds with S450; otherwise, execution proceeds with S460

When the delta value is greater than the quotient of Free_Quota by N, there is no point in balancing the quota across the active folders since the quota to be utilized cannot be fully contained in equal amounts per active folder. Therefore, at S450, all the active folders from the least recently updated to the most recently updated are traversed. For each such folder, an unused quota (with size equal to, e.g., the difference between F.LIMIT and F.USAGE, or a fraction thereof) is utilized to store part of the resource, until all objects of the resource have been successfully stored. After S450, execution may proceed with S425 before terminating.

In S460, each of the folders whose quota is greater than the quotient of Free_Quota by 'N' is traversed. Such folders are traversed from least recently updated to most recently updated, and their quota limits are set as equal to the quotient of Free_Quota by 'N', thereby giving the remainder to the requesting folder, until its quota is equal to the quotient of FreeQuota by 'N'.

It should be noted that a good choice of Allocation_Size value is critical to system performance. Alliocation_Size is the size of storage (e.g., in Kilobytes, Megabytes, Gigabytes, Terabytes, and the like) reallocated to one or more folders. A large number of the Allocation_Size value allows for more future allocations to be satisfied locally, by updating the target folder (with a fine-grained lock), without having to resort to locking the tenant. However, if the Allocation_Size is too large and there are many concurrent clients storing data to different folders belonging to the same tenant, the tenant may become depleted too quickly, forcing an expensive "reclaim unused quota" process.

Therefore, according to one embodiment, a heuristic is used to determine a good value for Allocation_Size. An example for such a heuristic may be a formula that takes into account statistics regarding the growth rate of each folder, in order to predict how much additional quota will be requested for this folder in the near future. A growth rate of a folder may be, for example, based on the size of the folder at various points in time. Another exemplary heuristic is a formula that takes into account the number of folders for which recent write operations occurred. Thus, if the number of folders for which recent write operations occurred is low (as a non-limiting example, 5 folders or fewer), Allocation_Size can be made larger. A write operation has occurred recently when the operation has been performed within a designated period of time (e.g., 24 hours). The Allocation_Size may also be a user configurable constant such as, for example, 1 Gigabyte.

It should be noted that given a good choice of Allocation_Size, in the vast majority of cases, when objects are stored, only the folder needs to be locked (which is a local lock to a single folder). Only rarely does the method need to lock the tenant (which is a global lock, blocking the entire tenant and, thus, all folders contained therein). This fine-grained locking results in much improved parallelism, and much improved system scalability.

It should be noted that some embodiments disclosed herein have been described with a reference to storage quotas. It should be appreciated that such embodiments are equally applicable to resource quotas as defined above.

The embodiments disclosed herein may be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The memory may be a volatile memory, non-volatile memory or any combination thereof. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal. The display segments and mini-display segments may be shown on a display area that can be a browser or another other appropriate application, either generic or tailored for the purposes described in detail hereinabove.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for enforcing tenant resource quotas in a cloud storage system, comprising:
   receiving a request to write an object to a target folder of a tenant, wherein the tenant is initially configured with a tenant quota limit and each of a plurality of folders of the tenant initially is configured with a folder quota limit, the folder quota limit and the tenant quota limit each being independent of any underlying storage structure providing the folders of the tenant and the tenant resource in the cloud storage system, wherein the tenant quota limit is then dynamically allocated to the plurality of folders of the tenant;
   determining whether the folder quota limit of the target folder of the tenant is sufficient for storage of the object;
   upon determining that the folder quota limit of the target folder is sufficient for storage of the object, increasing a folder quota usage of the target folder by a delta value; and
   storing the object in the target folder.

2. The method of claim 1, wherein determining whether the folder quota limit of the target folder further comprises:

checking if a sum of the folder quota usage and the delta value is no greater than the quota limit of the target folder.

3. The method of claim 1, further comprising:
upon determining that the folder quota limit is insufficient, determining whether the delta value is less than a difference between a tenant quota usage and the tenant quota limit of the tenant;
upon determining that the delta value is greater than the difference between the tenant quota usage and the tenant quota limit, dynamically reclaiming unused quotas from at least one other folder of the tenant; and
upon determining that the delta value is less than the difference between the tenant usage and the tenant limit, increasing the folder quota limit of the folder by an quota amount, wherein the quota amount is at least sufficient to allow storage of the object.

4. The method of claim 3, wherein the delta value is equal to a change in the amount of available quota upon writing the object.

5. The method of claim 3, wherein reclaiming unused quotas from at least one other folder of the tenant further comprises:
upon successful reclaiming of unused quota, increasing the folder quota limit of the folder, the tenant quota usage of the tenant, and the folder quota usage of the target folder to allocate the quota to the target folder to write the object.

6. The method of claim 3, wherein dynamically reclaiming unused quotas further comprises:
reclaiming quotas from one or more idle folders of the tenant;
upon determining that reclaiming quotas does not yield sufficient quotas, determining a growth rate of each folder of the tenant; and
allocating the resource among the folders of the tenant based on the growth rate of each folder.

7. The method of claim 6, further comprising:
determining a number of folders of the tenant that have been written to recently; and
allocating the resource among the folders of the tenant based on the number of folders that have been written to recently.

8. The method of claim 1, further comprising:
locking only the target folder to prevent writes to the target folder prior to determining if the folder quota limit is sufficient; and
unlocking the target folder when the folder quota limit of the target folder is insufficient for the allocated resource.

9. A non-transitory computer readable medium having stored thereon instructions for causing one or more processing units to execute the method according to claim 1.

10. A system for enforcing resource quotas in a cloud storage system, comprising:
a processor communicatively connected to a resource storage; and
a memory coupled to the processor, wherein the memory contains instructions that, when executed by the processor, configure the system to:
receive a request to write an object to a target folder of a tenant, wherein the tenant is initially configured with a tenant quota limit and each of a plurality of folders of the tenant initially is configured with a folder quota limit, the folder quota limit and the tenant quota limit each being independent of any underlying storage structure providing the folders of the tenant and the tenant resource in the cloud storage system, wherein the tenant quota limit is then dynamically allocated to the plurality of folders of the tenant;
determine whether the folder quota limit of the target folder of the tenant is sufficient for storage of the object;
upon determination that the folder quota limit of the target folder is sufficient for storage of the object, increase a folder quota usage of the target folder by a delta value; and
store the object in the target folder.

11. The system of claim 10, wherein the system is further configured to:
check if a sum of the folder quota usage and the delta value is no greater than the quota limit of the target folder.

12. The system of claim 10, wherein the system is further configured to:
determine whether the delta value is less than a difference between a tenant quota usage and the tenant quota limit of the tenant, upon determination that the folder quota limit is insufficient;
dynamically reclaiming unused quotas from at least one other folder of the tenant, upon determination that the delta value is greater than the difference between the tenant quota usage and the tenant quota limit; and
increase the folder quota limit of the folder by an quota amount, wherein the quota amount is at least sufficient to allow storage of the object, upon determination that the delta value is less than the difference between the tenant usage and the tenant limit.

13. The system of claim 12, wherein the delta value is equal to a change in the amount of available quota upon writing the object.

14. The system of claim 13, wherein the system is further configured to:
upon successful reclaiming of unused quota, increase the folder quota limit of the folder, the tenant quota usage of the tenant, and the folder quota usage of the target folder to allocate the quota to the target folder to write the object.

15. The system of claim 13, wherein the system is further configured to:
reclaim quotas from one or more idle folders of the tenant;
upon determining that reclaiming quotas does not yield sufficient quotas, determine a growth rate of each folder of the tenant; and
allocate the resource among the folders of the tenant based on the growth rate of each folder.

16. The system of claim 15, wherein the system is further configured to:
determine a number of folders of the tenant that have been written to recently; and
allocate the resource among the folders of the tenant based on the number of folders that have been written to recently.

17. The system of claim 10, wherein the system is further configured to:
lock only the target folder to prevent writes to the target folder prior to determining if the folder quota limit is sufficient; and
unlock the target folder when the folder quota limit of the target folder is insufficient for the allocated resource.

* * * * *